United States Patent [19]
Guo et al.

[11] Patent Number: 5,973,073
[45] Date of Patent: Oct. 26, 1999

[54] TWO-COMPONENT AQUEOUS POLYURETHANE COATINGS

[75] Inventors: Shao-Hua Guo, West Goshen; Donald L. Lickei, Wayne; Michael J. Morgan, Spring City, all of Pa.; James M. O'Connor, Cheshire, Conn.

[73] Assignee: ARCO Chemical Technology, L.P., Greenville, Del.

[21] Appl. No.: 09/055,419

[22] Filed: Apr. 6, 1998

[51] Int. Cl.$^6$ ............... C08J 3/00; C08K 3/20; C08L 75/00; C08F 8/30
[52] U.S. Cl. ............ 525/123; 428/423.1; 524/591; 524/839; 524/840; 524/507; 525/455
[58] Field of Search ................... 525/123, 455; 524/507, 597, 839, 840; 428/423.1

[56] References Cited

U.S. PATENT DOCUMENTS

| | | | |
|---|---|---|---|
| 5,075,370 | 12/1991 | Kubitza et al. | 524/591 |
| 5,194,487 | 3/1993 | Jacobs | 524/591 |
| 5,200,489 | 4/1993 | Jacobs et al. | 528/49 |
| 5,252,696 | 10/1993 | Laas et al. | 528/49 |
| 5,308,912 | 5/1994 | Margotte et al. | 524/507 |
| 5,380,792 | 1/1995 | Renk | 524/840 |
| 5,389,718 | 2/1995 | Potter et al. | 524/591 |
| 5,459,197 | 10/1995 | Schwindt et al. | 524/591 |
| 5,468,804 | 11/1995 | Schmalstieg et al. | 524/591 |
| 5,475,073 | 12/1995 | Guo | 526/333 |
| 5,525,693 | 6/1996 | Guo | 526/329.2 |
| 5,552,477 | 9/1996 | Dhein et al. | 524/840 |
| 5,563,207 | 10/1996 | Brahm et al. | 524/591 |
| 5,646,213 | 7/1997 | Guo | 524/562 |
| 5,646,225 | 7/1997 | Guo | 526/318.5 |
| 5,670,600 | 9/1997 | Nienhaus et al. | 528/75 |
| 5,693,703 | 12/1997 | Hart | 524/502 |

OTHER PUBLICATIONS

C. Hegedus and K. Klobier, "Aqueous Acrylic–Polyurethane Hybrid Dispersions and Their Use in Industrial Coatings," *J. Coatings Technology,* 68, No. 860 (Sep., 1996), pp. 39–48.

H. Dvorchak, "Using 'High Performance Two–Component Waterborne Polyurethane' Wood Coatings," *J. Coatings Technology,* 69, No. 866 (Mar., 1997), pp. 47–52.

J. Rosthauser and K. Nachtkamp, "Waterborne Polyurethanes," *Advances in Urethane Science and Technology,* 10, (1986), pp. 121–162.

W. Buckley, "Formulating high–performance two–component waterborne polyurethanes," *Modern Paints and Coatings,* Oct., 1996, pp. 81–86.

M. Dvorchak and H. Bui, "Mixing Study in Two–Component Waterborne Polyurethane Coatings with Hydrophobic and Hydrophilic Polyisocyanates," *Proceedings of the Twenty–Fifth International Waterborne, High–Solids, & Powder Coatings Symposium,* Feb. 18–20, 1998, pp. 80–92.

P. Jacobs et al., "Two–Component Waterborne Polyurethane Coatings Now And Into The Next Century," *60 Years of Polyurethanes,* Jan. 15–16, 1998, pp. 204–223.

*Primary Examiner*—Patrick D. Niland
*Attorney, Agent, or Firm*—Jonathan L. Schuchardt

[57] ABSTRACT

Two-component polyurethane coating formulations comprising an aqueous dispersion of a polyisocyanate and a neutralized, water-dispersible resin are disclosed. The neutralized, water-dispersible resin incorporates recurring units of an allylic alcohol or an alkoxylated allylic alcohol. These low-VOC formulations use commercial polyisocyanates and ordinary mixing techniques. The uniquely uniform distribution of hydroxyl groups in the resin contributes to an excellent overall balance of coating properties from the 2K system, including high gloss, hardness, impact resistance, flexibility, weatherability, and chemical resistance.

16 Claims, No Drawings

TWO-COMPONENT AQUEOUS POLYURETHANE COATINGS

FIELD OF THE INVENTION

The invention relates to two-component (2K) aqueous polyurethane coatings. In particular, the invention relates to aqueous coating dispersions from a hydroxy-functional resin based on an allylic alcohol or an alkoxylated allylic alcohol. The 2K aqueous dispersions are particularly valuable for formulating low-VOC coatings based on commercially available polyisocyanates.

BACKGROUND OF THE INVENTION

The coatings industry is under continuing regulatory pressure to develop formulations that reduce the levels of volatile organic compounds (VOCs) and hazardous air pollutants (HAPs) contained in paints and other coatings. Traditional coating formulations, including polyurethanes, are solvent-based and often cannot meet the newer restrictions on solvent use. Coating formulations in which water partially or completely replaces organic solvents continue to evolve.

Initially, aqueous polyurethane dispersions (PUDs), which are one-component coating systems, appeared in response to higher solvent prices and the increased demand for low-VOC coatings. These are usually made by reacting mixtures of polyols and dimethylolpropionic acid with a polyisocyanate to give a complete polyurethane or an isocyanate-terminated prepolymer. This product is then dispersed in water (which may contain other isocyanate-reactive compounds) by neutralizing the acid groups with a base, typically a tertiary amine. While aqueous PUDs provide a low-VOC alternative to traditional two-component, solvent-based coating formulations, they have some disadvantages. Because they are only lightly crosslinked, coatings from aqueous PUDs often lack adequate solvent resistance, water resistance, gloss, hardness, and weathering properties. In addition, a cosolvent is usually needed for good coalescence, so solvents are not easy to eliminate from the formulations. Preferably, low-VOC coatings could be made without sacrificing important physical properties.

In the early 1990s, two-component aqueous polyurethane coatings arrived on the scene (see generally: P. Jacobs et al., "Two-Component Waterborne Polyurethane Coatings: Now and Into the Next Century" and cited references). Bayer scientists discovered that it is possible to use water as a carrier for reactive 2K systems and still get coatings with good appearance and physical properties. Two-component aqueous polyurethane coating formulations are dispersions of separate polyol and polyisocyanate moieties. A coating film forms after water evaporates and the components react to give a crosslinked polymer network. While 2K aqueous polyurethane coatings should, in theory, match the properties available from solvent-based 2K systems, the coatings have, in practice, lacked adequate water resistance, gloss, weatherability, and hardness.

The success of aqueous 2K systems has, until now, relied on some important and often unwieldy formulation twists. For example, the polyol required, which needs both hydroxyl functionality for the polyurethane-forming reaction and acid groups for water dispersibility, is usually not commercially available. In one approach (illustrated by U.S. Pat. No. 5,075,370), an acrylate polymer with acid and hydroxyl functionalities is made by copolymerizing (in a free-radical polymerization) an acrylic acid monomer and a hydroxyalkyl acrylate monomer (e.g., hydroxyethyl acrylate or hydroxyethyl methacrylate). Unfortunately, hydroxyalkyl acrylates are rather expensive. In addition, it is difficult to make hydroxyalkyl acrylate polymers that have both high hydroxyl functionality and molecular weights low enough to have value for low-VOC, crosslinkable coating systems. The result is a lower level of coating physical properties than would otherwise be desirable. Recently developed hydroxy-functional acrylate polymers based on allylic alcohols and alkoxylated allylic alcohols (see, e.g., U.S. Pat. No. 5,525,693) overcome some of the limitations of using hydroxyalkyl acrylate monomers. However, the value of these resins has, until now, been demonstrated primarily for solvent-based polyurethane coatings (see Examples 9–11 of the '693 patent) or with high-styrene (>50 wt. %) resins (see U.S. Pat. No. 5,646,225), and not for aqueous polyurethane coatings.

A second common way to tweak the 2K aqueous polyurethane coating formulation is to modify the polyisocyanate. Most of the work to date has used a polyisocyanate modifed by partially reacting it with a hydrophilic polyether (see, e.g., U.S. Pat. Nos. 5,200,489, 5,194,487, 5,389,718, and 5,563,207). Making the polyisocyanate hydrophilic provides an emulsifiable crosslinker having improved compatibility with the co-reactants. This approach also has disadvantages, however. First, the hydrophilic polyisocyanate must be synthesized. Second, more of the expensive hydrophilic polyisocyanate must be used (compared with the unmodified polyisocyanates) to get the same NCO functionality contribution. Third, the hydrophilicity of the polyisocyanate is incorporated into the coating, often making its water sensitivity unacceptably high.

A third approach modifies the processing while keeping a commercial polyisocyanate in the formulation. The key concern is how adequately to disperse the polyisocyanate in water because emulsions made from commercial polyisocyanates tend to aggregate and settle. In one method, the particle size of the polyisocyanate is reduced by high-shear mixing (see the Jacobs article cited above). Unfortunately, high-shear mixing is energy-intensive, time-consuming, and requires special equipment. Adding cosolvents and emulsifiers can help, but this at least partially defeats the purpose of using an aqueous system.

Improved aqueous polyurethane coating compositions are needed. Preferably, the compositions would allow formulators to significantly reduce the levels of VOCs and HAPs present in paints and coatings. Preferably, the compositions are two-component systems without the physical property disadvantages of coatings based on aqueous PUDs. An ideal two-component system would use commercial polyisocyanates and yet would not require high-shear mixing. In addition, the ideal formulation would eliminate any need to make polyol components from expensive hydroxyalkyl acryate monomers. Finally, the industry would benefit from aqueous 2K polyurethane formulations that give coatings with an excellent balance of physical properties, including high gloss, hardness, impact resistance, flexibility, weatherability, and chemical resistance.

SUMMARY OF THE INVENTION

The invention is a two-component aqueous polyurethane coating formulation and a process for making it. The formulation comprises an aqueous dispersion of a polyisocyanate and a neutralized, water-dispersible resin. We surprisingly found that low-VOC, two-component aqueous polyurethanes can be made successfully without incorporating hydrophilic moieties into the polyisocyanate component. An important benefit of the formulations is the ability to use commercial polyisocyanates and ordinary mixing techniques.

A key component is the neutralized, water-dispersible resin, which incorporates recurring units of an allylic alcohol or an alkoxylated allylic alcohol. This resin eliminates any need to use expensive hydroxyalkyl acryate monomers to make the polyol component. In addition, the uniquely uniform distribution of hydroxyl groups in the resin contributes to an excellent overall balance of coating properties from the 2K system, including high gloss, hardness, impact resistance, flexibility, weatherability, and chemical resistance.

DETAILED DESCRIPTION OF THE INVENTION

Aqueous polyurethane coating formulations of the invention comprise dispersions of two components: (1) a polyisocyanate; and (2) a neutralized, water-dispersible resin.

Polyisocyanates suitable for use in the invention are aliphatic, cycloaliphatic, and aromatic polyisocyanates that are well known in the coatings art. Preferred polyisocyanates are commercially available aliphatic and cycloaliphatic polyisocyanates. Examples include hexamethylene diisocyanate (HDI), isophorone diisocyanate (IPDI), dimers and trimers thereof, and biuret, urethane, uretdione, and isocyanurate derivatives thereof, and mixtures of these. Also suitable, though less preferred, are toluene diisocyanates, diphenylmethane diisocyanates (MDIs), hydrogenated MDIs or TDIs, cyclohexanediisocyanates, and the like, and mixtures thereof. Other suitable polyisocyanates, including additional examples within the category of "paint polyisocyanates" are described in U.S. Pat. No. 5,075,370, the teachings of which are incorporated herein by reference.

A key advantage of the invention is the ability to use commercial polyisocyanates and ordinary mixing techniques. As discussed above, the 2K aqueous polyurethane systems now known typically require a hydrophilic polyisocyanate, which must be synthesized, often at considerable expense. Even then, the hydrophilic polyisocyanate can impart unwanted water-sensitivity to coatings. When commercial polyisocyanates have been used, energy-intensive, high-shear mixing has usually been employed. The invention overcomes these hurdles with a formulation in which ordinary, commerical polyisocyanates are easily used.

The amount of polyisocyanate needed depends on many factors within the skilled person's discretion, including the nature of the polyisocyanate and water-dispersible resin, the desired coating properties, the amount of water in the formulation, how the coating will be applied, the desired NCO/OH ratio, and other factors. Preferably, however, enough polyisocyanate is used to give an NCO/OH ratio within the range of about 1.0 to about 2.0; a more preferred range is from about 1.1 to about 1.7.

A key component of the aqueous coating formulation is the neutralized, water-dispersible resin. The resin incorporates recurring units of an allylic alcohol or an alkoxylated allylic alcohol. Use of these allylic monomers overcomes the need to incorporate hydroxyl functionality into the resins with relatively expensive hydroxyalkyl acrylate monomers (compare, e.g., U.S. Pat. No. 5,075,370).

Allylic alcohols useful in the invention preferably have the general structure $CH_2=CR-CH_2-OH$ in which R is selected from the group consisting of hydrogen and $C_1-C_5$ alkyl. Suitable allylic alcohols include, for example, allyl alcohol, methallyl alcohol, 2-ethyl-2-propen-1-ol, and the like, and mixtures thereof. Allyl alcohol and methallyl alcohol are preferred.

An alkoxylated allylic alcohol can be used instead of or in addition to the allylic alcohol. Preferred alkoxylated allylic alcohols have the general structure $CH_2=CR-CH_2-(A)_n-OH$ in which A is an oxyalkylene group, R is hydrogen or a $C_1-C_5$ alkyl group, and n, which is the average number of oxyalkylene groups in the alkoxylated allylic alcohol, has a value within the range of 1 to 2. Propoxylated allyl alcohols are particularly preferred. When A is oxypropylene, the groups have one or both of the structures $-OCH(CH_3)-CH_2-$ and $-O-CH_2-CH(CH_3)-$, which will depend upon the method of synthesis. U.S. Pat. No. 5,475,073, the teachings of which are incorporated herein by reference, describes ways to make suitable alkoxylated allylic alcohols.

The proportion of allylic alcohol or alkoxylated allylic alcohol present in the neutralized, water-dispersible resin depends on many factors, but most important among these is the desired hydroxyl group content of the resin. Generally, it is preferred to incorporate into the resin an amount of allylic alcohol or alkoxylated allylic alcohol within the range of about 5 to about 50 wt. %; a more preferred range is from about 10 to about 40 wt. %.

The resin is water-dispersible. By "water-dispersible," we mean that the resin must be able to form a stable dispersion, solution, or emulsion in water when the resin is converted to a neutralized form. Preferably, the resin is made water-dispersible by using monomers that can copolymerize with the allylic alcohol or alkoxylated allylic alcohol to give a product that has acidic or basic side-chain groups such as $-COOH$, $-SO_3H$, $-PO_3H$, $-C_6H_4-OH$, $-NH_2$, $-NHR$, or $-NR_2$. For example, acrylic acid copolymerizes with allyl alcohol to give a product that has carboxylic acid groups. Particularly preferred are resins that incorporate carboxylic acid groups from acrylic or methacrylic acid, especially when the resin contains from about 2 to about 15 wt. % of the acrylic acid.

The water-dispersible resin is "neutralized." A neutralized resin is produced by combining the resin containing acidic or basic groups with a neutralizing agent in an amount effective to convert at least some of the acidic or basic groups to salts. When the water-dispersible resin contains carboxylic acid groups, for example, it can be neutralized by adding a base such as an alkali or alkaline earth metal hydroxide, an organic amine (e.g., trimethylamine, triethylamine, dimethylethanolamine, or the like), or ammonia. Resins that contain amine groups are neutralized by adding an organic or inorganic acid. The presence of salts greatly enhances the ability of the resins to form stable aqueous dispersions.

Preferably, the water-dispersible resin incorporates recurring units of one or more acrylate monomers. Acrylate monomers suitable for use are esters of acrylic or methacrylic acid. Preferred acrylates are $C_1-C_{20}$ alkyl or aryl acrylates or methacrylates. $C_1-C_{10}$ alkyl acrylates are more preferred. Examples include methyl methacrylate, butyl methacrylates, butyl acrylates, n-hexyl methacrylate, and the like, and mixtures thereof. When an acrylate monomer is included, it preferably comprises from about 10 to about 80 wt. % of the water-dispersible resin; a more preferred range is from about 20 to about 60 wt. %.

The water-dispersible resin also optionally incorporates up to about 45 wt. % of recurring units from one or more other ethylenic monomers. Suitable ethylenic monomers include, for example, vinyl aromatic monomers, unsaturated nitriles, vinyl esters, vinyl ethers, vinyl halides, vinylidene halides, unsaturated anhydrides, acrylamides, conjugated dienes, and the like, and mixtures thereof. Vinyl aromatic monomers, particularly styrene, are preferred.

The water-dispersible resin usually has a number average molecular weight within the range of about 500 to about 10,000. A more preferred range is from about 1000 to about 5000. In addition, the resin typically has a hydroxyl number within the range of about 30 to about 300 mg KOH/g, more preferably from about 50 to about 200 mg KOH/g. The resin preferably has an average hydroxyl functionality from greater than 2 to about 20; more preferred is the range from about 3 to about 10. When the water-dispersible resin contains acidic groups, it preferably has an acid number within the range of about 10 to about 100 mg KOH/g, and more preferably from about 20 to about 60 mg KOH/g.

Water-dispersible resins used in the aqueous coating formulations of the invention, because they derive from allylic alcohols or alkoxylated allylic alcohols, have a uniquely uniform distribution of hydroxyl groups. In any sample of water-dispersible resin, the hydroxyl functionality (i.e., the number of hydroxyl groups per polymer chain) is relatively constant. The consistent hydroxyl functionality in the resin provides for more uniform crosslinking and better coating properties compared with resins that incorporate hydroxyl groups in other ways (e.g., by using hydroxyalkyl acrylate monomers). Essentially all of the polymer chains have 2 or more hydroxyl groups. In other words, the hydroxyl functionality of the water-dispersible resin is greater than 2.

The invention includes processes for making two-component, polyurethane coating formulations. One general process comprises forming an aqeuous dispersion by mixing a polyisocyanate and a neutralized, water- dispersible resin of the invention.

The water-dispersible resin is generally prepared according to the methods of U.S. Pat. Nos. 5,475,073, 5,646,213, and 5,646,225, the teachings of which are incorporated herein by reference. In particular, the allylic alcohol or alkoxylated allylic alcohol and other monomers are heated in the presence of a free-radical initiator at a temperature effective to copolymerize the monomers. The polymerization is usually performed at a temperature within the range of about 100° C. to about 200° C., more preferably from about 130° C. to about 170° C. Usually, all of the allylic alcohol or alkoxylated allylic alcohol is charged at the start of the reaction, while the other monomers are mostly added gradually during the polymerization. Gradual addition of the more reactive monomers (acrylates, vinyl aromatic monomers, acrylic acids, etc.) helps to achieve a uniform distribution of hydroxyl groups throughout the resin. Unreacted monomers are removed from the resin, if desired, by any suitable means, including vacuum stripping or thin-film evaporation.

The water-dispersible resin is converted to a water-dispersed resin by combining it with water and a neutralizing agent as described above. Usually, the resin and neutralizing agent are mixed well at elevated temperature until a stable resin dispersion or a clear solution results. The neutralized resin dispersions have excellent shelf stability.

To make aqueous coating compositions, the formulator combines, preferably by simple mixing, a polyisocyanate (preferably one that is commercially available) with the aqueous dispersion containing the neutralized resin and other conventional additives. In contrast to prior aqueous coating systems that use commercial polyisocyanates, high-shear mixing is usually not needed. As a skilled person will appreciate, however, high-shear mixing might offer some benefits for particular coating formulations of the invention in terms of easier processing or marginally better coating properties. Optionally, the polyisocyanate is combined with a standard coating solvent to improve dispersibility; preferably, however, no solvent is used. In the absence of a solvent, zero-VOC coating formulations can be made. Alternatively, the amount of solvent used is minimized to make coating formulations that contain less than 2.0 lbs./gal of VOCs. The coating formulations may contain flow aids, thixotropes, pigments, surfactants, fillers, dyes, and other conventional additives.

In a preferred process of the invention, the resin is made by polymerizing a propoxylated allylic alcohol, an acrylate, and an acrylic acid, optionally in the presence of a vinyl monomer, to produce a water-dispersible resin. The resin is then combined with water and a neutralizing agent in an amount and manner effective to produce an aqueous mixture in which at least some of the acid groups of the resin are converted to salt groups. Next, the aqueous mixture is combined with a polyisocyanate or an aqueous polyisocyanate dispersion to give the coating formulation.

Coating formulations of the invention are applied using techniques that are well known in the art. For example, the formulations can be applied by roller, brush, spray, or any other suitable means. The coating formulations are then usually cured by baking at elevated temperature, preferably at a temperature within the range of about 50° C. to about 150° C. for a few minutes to several hours. In the alternative, they are cured at ambient temperature over several days.

As the results below demonstrate, the 2K polyurethane coating formulations of the invention give excellent coatings with the drawdown and spray methods commonly used in the art. The coating formulations summarized in Table 1 use a propoxylated allyl alcohol having an average of about 1.6 oxypropylene units for the resins (Resins B or C). Other formulations (Table 3) use propoxylated allyl alcohol having an average of 1.0 oxypropylene unit (Resin E). Tables 2 and 4 show that coatings made from the neutralized, water-dispersible resins have an impressive overall balance of physical and mechanical properties. In particular, the coatings have favorable gloss, hardness, flexibility, weatherability, and impact properties. In addition, the coatings are non-yellowing and demonstrate good humidity and chemical resistance.

The following examples merely illustrate the invention. Those skilled in the art will recognize many variations that are within the spirit of the invention and scope of the claims.

EXAMPLE A

Preparation of a Water-Dispersible Resin

Propoxylated allyl alcohol (219 g, average of 1.6 oxypropylene units) and t-butyl hydroperoxide (70 wt. % in water, 23.7 g) are charged to a one-liter, stainless-steel reactor equipped with agitator, steam heating jacket, temperature controller, nitrogen inlet, vacuum takeoff adaptor, and monomer addition pump. Methacrylic acid (29 g), n-butyl methacrylate (213 g), styrene (29 g), and butyl acrylate (41 g) are mixed well and purged with nitrogen. A portion (41 g) of this monomer mixture is charged to the reactor, while the rest is transferred to the addition pump. The reactor is purged three times with nitrogen and sealed, and the contents are heated to 145° C. The monomer mixture is added to the reactor over 5 hours at a decreasing rate as follows: first hour: 80 g; second hour: 70 g; third hour: 60 g; fourth hour: 40 g; fifth hour: 20 g. Heating at 145° C. continues for an additional 0.5 h after monomer addition is complete. Unreacted monomers are removed by vacuum distillation at or below 145° C. Yield: 429 g. The resin has hydroxyl number:

112 mg KOH/g; acid number: 39 mg KOH/g; $T_g$ (by DSC): −18° C. GPC shows Mw=7500; Mn=2500.

EXAMPLE B

Preparation of a Water-Dispersed Resin ("Resin B")

The water-dispersible resin of Example A (20 g) is added to water (27 g) and triethylamine (3.0 g) in a sample bottle. The bottle is placed in an oven at 80° C. After 1 h, the bottle is removed and shaken vigorously. The mixture is a milky, white suspension while hot. Upon cooling to room temperature, a pale yellow solution results.

EXAMPLE C

Preparation of a Water-Dispersed Resin ("Resin C")

The water-dispersible resin of Example A (80 g) is added to water (114 g) and triethylamine (5.6 g) in a sample bottle. The bottle is placed in an oven at 80° C. After 0.5 h, the bottle is removed and is shaken vigorously. The bottle is returned to the oven, and is removed at 0.5-hour intervals for more agitation. After 4 h, the resin is completely dispersed, and the hot mixture is a milky, white suspension. Upon cooling to room temperature, a pale yellow solution results.

EXAMPLE D

Preparation of a Water-Dispersible Resin

The procedure of Example A is followed, except that propoxylated allyl alcohol having an average of 1.0 oxypropylene units (175 g) is used. Yield: 388 g. The resin has hydroxyl number: 110 mg KOH/g; acid number: 43 mg KOH/g; $T_g$ (by DSC): 0° C. GPC shows Mw=8400; Mn=3190.

EXAMPLE E

Preparation of a Water-Dispersed Resin ("Resin E") The water-dispersible resin of Example D (80 g) is added to water (114 g) and triethylamine (6.2 g) in a sample bottle. The bottle is placed in an oven at 80° C. After 1 h, the bottle is removed and shaken vigorously. The bottle is removed at 30-min intervals until the resin is completely dispersed (three additional intervals). After cooling to room temperature, more water (42.4 g) is added to the dispersion. The bottle is returned to the 80° C. oven, and after 1 h, the bottle is removed and shaken vigorously. Upon cooling to room temperature, a clear, yellow, viscous solution results.

EXAMPLES 1–12

Coatings from the Water-Dispersed Resins

Coating formulations based on Resins B, C, or E are prepared as follows. The water-dispersed resin (25 g) is combined and hand-stirred with the surfactants (0.4 g each of 10% SILWET 7604 and 10% SILWET 7605, products of Union Carbide) and dipropylene glycol dimethyl ether (DDM) (6.0 g). The isocyanate component (1.2 or 1.7 NCO/OH ratio; see Tables 1 and 3) is then added, and the mixture is stirred well by hand.

Drawdown method: The coating formulation is spread in the usual way onto Bonderite steel panel with a 15-mil drawdown bar to give a dry coating of about 2-3 mils. The panels are baked at 80° C. for 30 min., then cooled to room temperature. Physical properties and chemical resistance of the coatings are determined immediately; Tables 2 and 4 summarize the results.

Spray method: The coating formulation includes 6–7 g of water to make the mixture suitable for spray application. Steel panels are sprayed with the coating formulation, baked at 80° C. for 30 min., and cooled to room temperature. Physical properties and chemical resistance of the coatings are determined immediately; Tables 2 and 4 summarize the results.

The preceding examples merely illustrate the invention; the following claims define the scope of the invention.

TABLE 1

Coating Formulations

| | Ex. # | | | | | |
|---|---|---|---|---|---|---|
| | 1 | 2 | 3 | 4 | 5 | 6 |
| Resin B | 25 | 0 | 0 | 0 | 0 | 0 |
| Resin C | 0 | 25 | 25 | 25 | 25 | 25 |
| XDW-1021 | 8.47 | 8.47 | 0 | 0 | 0 | 0 |
| Luxate HD-100 | 0 | 0 | 6.49 | 6.49 | 3.25 | 3.25 |
| Luxate HT-2000 | 0 | 0 | 0 | 0 | 3.25 | 3.25 |
| 10% Silwet 7604 | 0.4 | 0.4 | 0.4 | 0.4 | 0.4 | 0.4 |
| 10% Silwet 7605 | 0.4 | 0.4 | 0.4 | 0.4 | 0.4 | 0.4 |
| DMM | 6.0 | 6.0 | 6.0 | 6.0 | 6.0 | 6.0 |
| Water | 0 | 6.0 | 0 | 7.0 | 0 | 7.0 |
| NCO/OH | 1.7 | 1.7 | 1.7 | 1.7 | 1.7 | 1.7 |
| Method | drawdown | spray | drawdown | spray | drawdown | spray |

XDW-1021 is a 1:1 blend of hexamethylene diisocyanate (HDI) dimer and isophorone diisocyanate trimer, 85% solids in dipropylene glycol dimethyl ether (DMM). Luxate HD-100 is HDI dimer; Luxate HT-2000 is HDI trimer; both are products of ARCO Chemical. Silwet 7604 and 7605 are silicone surfactants (10% aq.), products of Union Carbide.

TABLE 2

Coating Physical Properties & Solvent Resistance (Resins B and C)

| | Ex. # | | | | | |
|---|---|---|---|---|---|---|
| | 1 | 2 | 3 | 4 | 5 | 6 |
| Thickness (mil) | 1.4 | 3.2 | 2.6 | 1.9 | 1.8 | 2.0 |
| Gloss, 20° | 91 | 78 | 67 | 85 | 73 | 85 |
| Gloss, 60° | 105 | 103 | 97 | 101 | 107 | 103 |
| Pendulum hardness | 116 | 56 | | | | 31 |
| Pencil hardness | | HB | 2B | 4B–2B | 2B | 2B |
| Direct impact (in.-lb.) | 120 | 60 | 160 | 160 | 160 | 160 |
| Reverse impact (in.-lb.) | 80 | <10 | 160 | 160 | 160 | 160 |

TABLE 2-continued

Coating Physical Properties & Solvent Resistance
(Resins B and C)

| | Ex. # | | | | | |
|---|---|---|---|---|---|---|
| | 1 | 2 | 3 | 4 | 5 | 6 |
| Cross-hatch adhesion | pass | pass | – 10% | pass | pass | pass |
| 1/8" mandrel bend | pass | pass | pass | pass | pass | pass |
| MEK (double rubs) | sl. mar | sl. mar | pass | pass | pass | pass |
| xylenes | pass | ring | ring | ring | pass | pass |
| aq. HCl | pass | pass | pass | pass | pass | pass |
| aq. NaOH | pass | pass | pass | pass | pass | pass |
| aq. HOAc | pass | pass | pass | pass | pass | pass |
| Humidity, 8 h | pass | pass | pass | pass | pass | pass |

ASTM Methods: gloss (König): D523; pendulum hardness: D4366; pencil hardness: D3363; cross-hatch adhesion: D3002; 1/8" mandrel bend: D522; direct and reverse impact: D3281; 8-h humidity test: D1735.

TABLE 3

Coating Formulations

| | Ex. # | | | | | |
|---|---|---|---|---|---|---|
| | 7 | 8 | 9 | 10 | 11 | 12 |
| Resin E | 25 | 25 | 25 | 25 | 25 | 25 |
| Luxate HD-100 | 2.6 | 2.6 | 2.6 | 2.6 | 1.8 | 1.8 |
| Luxate HT-2000 | 2.6 | 2.6 | 2.6 | 2.6 | 1.8 | 1.8 |
| 10% Silwet 7604 | 0.4 | 0.4 | 0.4 | 0.4 | 0.4 | 0.4 |
| 10% Silwet 7605 | 0.4 | 0.4 | 0.4 | 0.4 | 0.4 | 0.4 |
| DMM | 6.0 | 6.0 | 6.0 | 6.0 | 6.0 | 6.0 |
| Water | 0 | 0 | 3.0 | 3.0 | 3.0 | 3.0 |
| NCO/OH | 1.7 | 1.7 | 1.7 | 1.7 | 1.2 | 1.2 |
| Method | drawdown | drawdown | spray | spray | spray | spray |

Luxate HD-100 is HDI dimer; Luxate HT-2000 is HDI trimer; both are products of ARCO Chemical. Silwet 7604 and 7605 are silicone surfactants (10% aq.), products of Union Carbide.

TABLE 4

Coating Physical Properties & Solvent Resistance (Resin E)

| | Ex. # | | | | | |
|---|---|---|---|---|---|---|
| | 7 | 8 | 9 | 10 | 11 | 12 |
| Thickness (mil) | 1.8 | 1.8 | 2.0 | 1.8 | 1.9 | 2.0 |
| Gloss, 20° | 88 | 90 | 83 | 90 | 88 | 92 |
| Gloss, 60° | 103 | 105 | 103 | 104 | 103 | 104 |
| Pendulum hardness | 96 | 106 | 38 | 59 | 94 | 35 |
| Pencil hardness | HB | HB | HB | HB | HB | 2B |
| Direct impact (in.-lb.) | 160 | 160 | 160 | 160 | 160 | 160 |
| Reverse impact (in.-lb.) | 160 | 160 | 160 | 160 | 160 | 160 |
| Cross-hatch adhesion | pass | pass | pass | pass | pass | pass |
| 1/8" mandrel bend | pass | pass | pass | pass | pass | pass |
| MEK (double rubs) | pass | pass | sl. mar | sl. mar | sl. mar | pass |
| xylenes | ring | ring | ring | ring | ring | ring |
| aq. HCl | pass | pass | pass | pass | pass | pass |
| aq. NaOH | pass | pass | pass | pass | pass | pass |
| aq. HOAc | pass | pass | pass | pass | pass | pass |
| Humidity, 8 h | pass | pass | pass | pass | pass | pass |

ASTM Methods: gloss (König): D523; pendulum hardness: D4366; pencil hardness: D3363; cross-hatch adhesion: D3002; 1/8" mandrel bend: D522; direct and reverse impact: D3281; 8-h humidity test: D1735.

We claim:

1. A two-component polyurethane coating formulation which comprises an aqueous dispersion of:
   (a) a polyisocyanate; and
   (b) a neutralized, water-dispersible resin comprising recurring units of:
   (i) an allylic alcohol having the structure $CH_2$=CR—$CH_2$—OH in which R is selected from the group consisting of hydrogen and $C_1$–$C_5$ alkyl, or
   (ii) an alkoxylated allylic alcohol having the structure $CH_2$=CR—$CH_2$—$(A)_n$—OH in which A is an oxyalkylene group, R is hydrogen or a $C_1$–$C_5$ alkyl group, and n, which is the average number of oxyalkylene groups in the alkoxylated allylic alcohol, has a value within the range of 1 to 2.

2. The coating formulation of claim 1 wherein the polyisocyanate is an aliphatic or a cycloaliphatic diisocyanate.

3. The coating formulation of claim 1 wherein the water-dispersible resin further comprises recurring units of an acrylate, an acrylic acid, and a vinyl aromatic monomer.

4. The coating formulation of claim 1 wherein the water-dispersible resin has an acid number within the range of about 10 to about 100 mg KOH/g.

5. The coating formulation of claim 1 wherein the water-dispersible resin has an average hydroxyl functionality within the range of greater than 2 to about 20.

6. The coating formulation of claim 1 wherein the water-dispersible resin comprises from about 5 to about 50 wt. % of the alkoxylated allylic alcohol, and further comprises from about 10 to about 80 wt. % of an acrylate, from about 2 to about 15 wt. % of an acrylic acid, and up to about 45 wt. % of a vinyl aromatic monomer.

7. The coating formulation of claim 1 wherein the water-dispersible resin has an essentially uniform distribution of hydroxyl groups.

8. A coating prepared from the coating formulation of claim 1.

9. A coated article prepared with the coating formulation of claim 1.

10. A two-component polyurethane coating formulation which comprises an aqueous dispersion of:
   (a) an aliphatic or a cycloaliphatic diisocyanate; and
   (b) a neutralized, water-dispersible resin comprising recurring units of a propoxylated allylic alcohol, an acrylate, an acrylic acid, and a vinyl aromatic monomer, wherein the propoxylated allylic alcohol has the structure $CH_2$=CR—$CH_2$—$(A)_n$—OH in which A is an oxypropylene group, R is hydrogen or a $C_1$–$C_5$ alkyl group, and n, which is the average number of oxypropylene groups in the propoxylated allylic alcohol, has a value within the range of 1 to 2.

11. The coating formulation of claim 10 wherein the water-dispersible resin comprises from about 5 to about 50 wt. % of the propoxylated allylic alcohol, from about 10 to about 80 wt. % of the acrylate, from about 2 to about 15 wt. % of the acrylic acid, and up to about 45 wt. % of the vinyl aromatic monomer.

12. A process for making a two-component, polyurethane coating formulation, said process comprising forming an aqueous dispersion by mixing a polyisocyanate and a neutralized, water-dispersible resin that comprises recurring units of:
(a) an allylic alcohol having the structure $CH_2$=CR—$CH_2$—OH in which R is selected from the group consisting of hydrogen and $C_1$–$C_5$ alkyl, or
(b) an alkoxylated allylic alcohol having the structure $CH_2$=CR—$CH_2$—$(A)_n$—OH in which A is an oxyalkylene group, R is hydrogen or a $C_1$–$C_5$ alkyl group, and n, which is the average number of oxyalkylene groups in the alkoxylated allylic alcohol, has a value within the range of 1 to 2.

13. The process of claim 12 wherein the polyisocyanate is an aliphatic or a cycloaliphatic diisocyanate.

14. The process of claim 12 wherein the water-dispersible resin further comprises recurring units of an acrylate, an acrylic acid, and a vinyl aromatic monomer.

15. A coating formulation made by the process of claim 12.

16. A process for making a two-component, polyurethane coating formulation, said process comprising:
(a) polymerizing a propoxylated allylic alcohol having the structure $CH_2$=CR—$CH_2$—$(A)_n$—OH in which A is an oxypropylene group, R is hydrogen or a $C_1$–$C_5$ alkyl group, and n, which is the average number of oxypropylene groups in the propoxylated allylic alcohol, has a value within the range of 1 to 2, an acrylate, and an acrylic acid, optionally in the presence of a vinyl aromatic monomer, to produce a water-dispersible resin;
(b) combining the resin with water and a neutralizing agent in an amount and manner effective to produce an aqueous mixture in which at least some of the acid groups of the resin are converted to salt groups; and
(c) combining the aqueous mixture with a polyisocyanate or an aqueous polyisocyanate dispersion to produce the coating formulation.

* * * * *